United States Patent
Regev (10) Patent No.: US 6,886,527 B2
(45) Date of Patent: May 3, 2005

(54) ROTARY VANE MOTOR

(75) Inventor: Aron Regev, Richmond Hill (CA)

(73) Assignee: Rare Industries Inc., Richmond Hill (CA)

( * ) Notice: Subject to any disclaimer, the term of this patent is extended or adjusted under 35 U.S.C. 154(b) by 17 days.

(21) Appl. No.: 10/400,679

(22) Filed: Mar. 28, 2003

(65) Prior Publication Data

US 2004/0187803 A1 Sep. 30, 2004

(51) Int. Cl.$^7$ ............................................. F02B 53/00
(52) U.S. Cl. ......................... 123/245; 123/234; 418/36; 74/437
(58) Field of Search ............................. 123/245, 18 A, 123/18 R, 200, 234; 418/36, 34, 33, 38; 74/437, 436, 435

(56) References Cited

U.S. PATENT DOCUMENTS

| | | | |
|---|---|---|---|
| 1,568,053 A | | 1/1926 | Bullington |
| 2,211,292 A | | 8/1940 | Ryerson ..................... 418/36 |
| 3,144,007 A | | 8/1964 | Kauertz ..................... 418/36 |
| 3,396,632 A | * | 8/1968 | Leblanc ..................... 418/36 |
| 3,721,131 A | * | 3/1973 | Ingham ..................... 74/393 |
| 3,769,946 A | | 11/1973 | Scherrer |
| 3,873,247 A | * | 3/1975 | Boes ........................ 418/36 |
| 3,948,227 A | | 4/1976 | Guenther |
| 4,068,985 A | * | 1/1978 | Baer ......................... 418/36 |
| 4,169,697 A | * | 10/1979 | Doundoulakis .............. 418/34 |
| 4,844,708 A | * | 7/1989 | Lopez ....................... 418/36 |
| 5,133,317 A | * | 7/1992 | Sakita ...................... 123/234 |
| 5,381,766 A | * | 1/1995 | Sakita ...................... 123/245 |
| 5,433,179 A | * | 7/1995 | Wittry ...................... 123/245 |
| 5,992,371 A | | 11/1999 | Raso |
| 6,257,196 B1 | * | 7/2001 | Alvarado ................... 123/245 |
| 6,289,876 B1 | | 9/2001 | Mackert |
| 6,349,696 B1 | | 2/2002 | Shang et al. |

FOREIGN PATENT DOCUMENTS

| | | | | |
|---|---|---|---|---|
| GB | | 1031626 | 6/1966 | .......... F02B/53/00 |
| JP | | 55164701 A | * 12/1980 | .................. 418/36 |
| JP | | 58079623 A | * 5/1983 | ................. 123/245 |
| JP | | 01210102 A | * 8/1989 | .................. 418/36 |
| JP | | 02308923 A | * 12/1990 | ................. 123/200 |
| RU | | 2215159 | 10/2003 | .......... F02B/53/02 |
| WO | | WO 8605548 A1 | * 9/1986 | ................. 123/200 |

* cited by examiner

Primary Examiner—Thai-Ba Trieu (57) ABSTRACT

A rotary vane motor uses a gear train arrangement for controlling the position of the vanes as well as the compression ratio of the motor. The motor includes a first pair of vanes namely a leading and trailing vane defining a working chamber therebetween and an opposed second pair of vanes namely a leading and trailing vane defining therebetween a second working chamber. Preferably the motor uses a pair of second order elliptical gears for controlling movement of the vanes to define an intake stage, a compression stage, an expansion stage, and an exhaust stage. In a preferred structure of the motor both the intake port and the exhaust port are movable to change or alter the intake stage and the exhaust stage respectively.

22 Claims, 10 Drawing Sheets

ROTARY VANE MOTOR

FIELD OF THE INVENTION

The present invention relates to a rotary combustion motor and in particular relates to a rotary combustion motor of improved design where the motor has a series of oscillating vanes to define the various strokes of the motor.

BACKGROUND OF THE INVENTION

Rotary combustion vane type motors are known where the vanes rotate about a central axis of rotation and the vanes rotate within an outer cylindrical ring or chamber. The vanes extend through the central axis of rotation with a pair of leading vanes mechanically connected and extending to either side of the axis of rotation and a pair of trailing vanes which also extend to either side of the central axis of rotation. Each leading vane has an associated trailing vane with a working chamber located between the two vanes. The vanes are controlled by a gear train or crank arm arrangement whereby during each rotation of the vanes, the vanes go through a series of stages defining the equivalent of an intake stroke, a compression stroke, a power stroke and an exhaust stroke.

The present invention provides a structure which is economical to manufacture and in its preferred embodiment is easily varied for different applications and fuels.

SUMMARY OF THE PRESENT INVENTION

A rotary vane type motor according to the present invention comprises a first rotary member having a pair of leading vanes and a second rotary member having a pair of trailing vanes with each rotary member having a common central rotation axis. Each leading vane has an associated trailing vane which define therebetween, a working chamber such that both working chambers are defined on opposite sides of the central rotation axis. The vanes rotate within a cylindrical chamber and the cylindrical chamber includes an intake port and an exhaust port. The leading vanes are driven by a drive shaft and the trailing vanes are driven by a drive shaft. The two drive shafts are connected by a drive train. The drive train determines the relative movement of the trailing vane towards and away from the associated leading vane as the vanes rotate about the common central rotation axis and define the stages of the combustion cycle. The drive train further includes means for varying the position of the trailing vanes relative to the leading vanes to thereby vary the compression ratio of the motor.

According to an aspect of the invention, the drive train includes a pair of second order elliptical gears which determine the relative movement of the leading and trailing vanes.

According to a further aspect of the invention, the means for varying the position of the trailing vanes relative to the leading vanes is a planetary gear system. The planetary gear system includes a movable outer ring gear, a central sun gear and a pair of planetary gears. The movement of the ring gear varies the position of the trailing vanes relative to the leading vanes. With this arrangement, movement of the ring gear in one direction increases the compression ratio of the motor and movement in the opposite direction decreases the compression ratio.

In yet a further aspect of the invention during normal operation, the ring gear remains fixed and the planetary gears rotate about the driven sun gear.

According to yet a further aspect of the invention the ring gear is adjusted during the operation of the motor to vary the compression ratio.

In yet a further aspect of the invention the vane type motor includes a processor for adjusting the compression ratio as a function of sensed motor conditions.

In yet a further aspect of the invention the intake port includes an adjustment mechanism for adjusting the angular position of the intake port along a perimeter edge of the cylindrical chamber.

In yet a further aspect of the invention the exhaust port includes an adjustment mechanism for adjusting the angular position of the exhaust port along a perimeter edge of the cylindrical chamber.

In yet a further aspect of the invention both the intake port and the exhaust port are movable relative to the cylindrical chamber to alter their position.

In yet a further aspect of the invention the cylindrical chamber includes an open exhaust portion which is partially closed by the exhaust port. The exhaust port is movable along the exhaust portion whereby the position of the exhaust port can be varied relative to the cylindrical chamber. In this way the timing relationship of the exhaust port relative to the exhaust stage of the motor can be varied.

In yet a further aspect of the invention the cylindrical chamber includes an open intake portion which is partially closed by the intake port. The intake port is movable along the intake portion whereby the position of the intake port can be varied relative to the cylindrical chamber. In this way the timing relationship of the intake port relative to the intake stage of the motor can be varied.

The position of the intake and exhaust ports can be adjusted for specific operating conditions or motor sensed conditions. For example, these operating or sensed conditions include, but are not limited to load, temperature, barometric pressure, speed, emission properties, and motor knock.

In yet a further aspect of the vane type motor the leading vane has a non planar surface facing the associated trailing vane which, in combination with the trailing vane during a compression stage of the motor, defines a combustion chamber which is shifted outwardly away from the central rotation axis.

The cylindrical chamber includes a series of cooling ports extending through the walls of the cylindrical chamber generally parallel to the central axis of rotation. For some applications, air cooling may be sufficient and cylinder cooling fins can be used.

In yet a further aspect of the invention, a spray lubricant injector is located in the cylindrical chamber in advance of the final compression stage. The spray lubricant injector provides a lubricant which conditions seals associated with each of the vanes, reduces friction and provides cooling. The lubricant injector preferably sprays an atomized lubricant mist into the non working chambers defined between a trailing vane and a leading vane.

BRIEF DESCRIPTION OF THE DRAWINGS

The above as well as other advantages and features of the present invention will be described in greater detail according to the preferred embodiments of the present invention in which.

DETAILED DESCRIPTION OF THE PREFERRED EMBODIMENTS

The rotary vane type motor 2 includes a first rotary member 4 having opposed leading vanes 6 and 8 on either side of a central axis of rotation 9. A second rotary member 10 has opposed trailing vanes 12 and 14. Leading vane 6 cooperates with trailing vane 12 to define a working chamber therebetween and leading vane 8 and trailing vane 14 cooperate to define a working chamber therebetween.

The first rotary member 4 includes a central spindle 20 which is keyed to the drive shaft 22. The first rotary member operates at more consistent rotary speed whereas the second rotary member 10 is driven by the pair of second order elliptical gears 32 and 34 to accelerate or decelerate relatively to the first rotary member. Other arrangements for controlling the relative movement of the vanes can be used. For example, crank arms associated with each rotary member as shown in U.S. Pat. No. 3,592,571 Drury can be used or two pairs of first order elliptical gears each rotatable about one foci can be used. The pair of second order elliptical gears simplifies the drive arrangement and is the preferred drive train for controlling relative movement of the vanes.

The rotary members and in particular the pairs of leading vanes and trailing vanes which define working chambers therebetween, during each revolution complete an intake stage, a compression stage, a power stage and an exhaust stage (see FIGS. 10A through 10F). The second rotary member 10 has a central spindle 28 which is keyed to the drive shaft 30. Drive shaft 30 is secured to and causes rotation of the second order elliptical gear 32 which is in drive relationship with the adjacent second order elliptical gear 34 keyed on shaft 36. The shaft 36 is connected to the extending arms 37 and 38 which are driven by the planetary gears 46 and 48.

Figure 1:
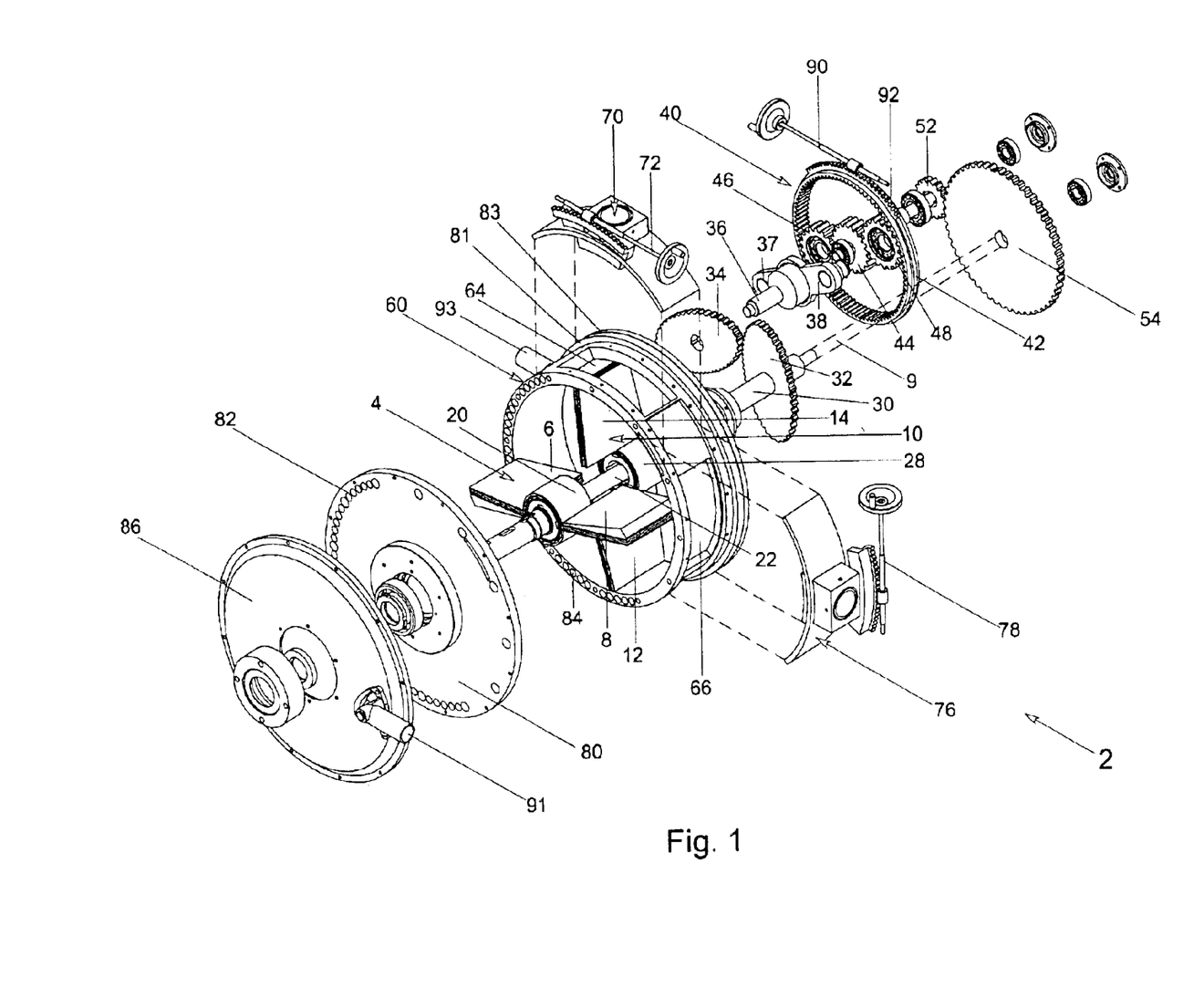
FIG. 1 is an exploded perspective view of the rotary combustion motor.

As shown in FIG. 1, the planetary gear system 40 includes an outer ring gear 42, a sun gear 44 and opposed planetary gears 46 and 48. Power is transmitted to the planetary gear system by drive gear 54 which is keyed on drive shaft 22. Drive shaft 22 is keyed to and causes rotation of the first rotary member 4. The drive gear 54 is in mesh with the spur gear 52 which causes rotation of the sun gear 44. Rotation of the sun gear 44 causes rotation of the planetary gears 46 and 48 about the sun gear. The rotation of the planetary gears about the sun gear causes rotation of the arms 37 and 38 thereby causing rotation of shaft 36. With this arrangement, second order elliptical gear 34 which is keyed to the shaft 36 causes rotation of the adjacent second order elliptical gear 32 and thus rotation of the drive shaft 30. As shown in FIG. 1 drive shaft 30 is a hollow tube member which receives centrally therethrough the drive shaft 22.

With this arrangement the trailing vanes are accelerated towards and away from the leading vanes in timed relationship to define the various stages of the combustion process. As can be appreciated, the use of drive gear 54, spur gear 52 and the planetary gear system 40 as well as the pair of second order elliptical gears 32 and 34 provides a simple drive train for coordinating the desired movement of the trailing vanes relative to the leading vanes during each revolution of the leading vanes.

The leading and trailing vanes cooperate with the cylindrical chamber 60 to define two working chambers and two non-working chambers. This cylindrical chamber is basically divided into opposed sections where compression and expansion occur in the portion of the cylindrical chamber having the fluid cooling ports 84 and the exhaust and intake stages occur in the remaining portion of the cylindrical chamber. This remaining portion includes an open exhaust portion 64 and an open intake portion 66.

A sliding exhaust port 70 closes the open exhaust portion 64 while allowing the position of the exhaust port relative to the cylindrical chamber to vary. An adjustment mechanism 72 allows movement of the sliding exhaust port 70 and this adjustment changes the angular position of the exhaust port 70 along a perimeter edge of the cylindrical chamber 60.

Similarly, a sliding intake port 76 closes the open intake portion 66. An adjustment mechanism 78 allows the position of the sliding intake port to vary in angular position along a perimeter edge of the cylindrical chamber 60. In this way, the exhaust port and the intake port can be varied to cooperate with the rotary vanes in a different timed relationship during the respective intake stage and exhaust stage. With this arrangement, the position of the ports can be adjusted to suit different operating conditions, different motor applications, or different working parameters of the motor.

The cylindrical chamber 60 is closed on either side thereof by closing plates 80 and 81. Both the leading and trailing vanes, as well as their associated spindles 20 and 28, include a spring loaded seal arrangement which contacts the sidewalls of the closing plates 80 and 81 as well as the circular outer wall of the cylindrical chamber. (see FIGS. 4, 5, 7, 8 and 9).

Closing plates 80 and 81 have a series of ports 82 which align with the cooling fluid ports 84 of the cylindrical chamber. Fluid is introduced through inlet 91 of the cooling housing 86 and circulated to remove heat from the cylindrical chamber. Fluid is removed through outlet 93 of the cooling housing 83.

A feature of the present structure is the ability to vary the timing of the movement of the trailing vanes relative to the leading vanes. This is accomplished by changing the position of the outer ring gear 42. An adjustment mechanism 90 includes a worm drive associated with the series of teeth 92 to allow rotation of the ring gear 42 about the sun gear 44. The movement of the ring gear causes movement of the planetary gears and thus the position of the trailing vanes relative to the leading vanes is changed. Basically the planetary gear arrangement controls the end positions of the trailing vanes relative to the leading vanes whereas the elliptical gears 32 and 34 determine the movement of the trailing vane relative to the leading vane. The adjustment mechanism 90 can be varied during operation of the motor.

For example, a speed sensing arrangement can be provided and the compression ratio can be varied as a function of speed. A change in the position of the ring gear changes the compression ratio of the motor. During initial start up of the motor and at slow speeds a lower compression ratio can be used whereas an adjustment can occur and a higher compression ratio can be used at higher speeds. Thus the rotary motor can be controlled during the operation thereof to vary the compression ratio of the motor. The compression ratio can be automatically varied during operation of the motor according to environmental and/or motor conditions or can be manually adjusted such that the compression ratio during operation is fixed. For example, the compression ratio can be adjusted as a function of load measurement, various temperature sensors and/or sensed conditions associated with the intake and exhaust ports. As can be appreciated, other sensed operating condition or environment conditions can be sensed and used to adjust the compression ratio.

The ability to change the compression ratio is also helpful during starting of the motor. By reducing the compression ratio during starting, a smaller starter can be used and a smaller battery can be used.

Although it is possible to vary the compression ratio during the operation of the motor it is also useful in some applications to merely set the compression ratio for a particular application. For example, compression ratio can be set according to the particular available fuel or for the particular motor application. In this case, the adjustment of the compression ratio via the ring gear can be movable between different predetermined positions appropriate for different fuels. With this arrangement, the motor can switch from one fuel to a different fuel by appropriately adjusting the compression ratio. For example, in an automobile application, a switch can be provided for changing the compression ratio according to two or more different fuels.

Elimination of the planetary gear system is possible if adjustment during operation is not required. In this case, gear 52 and gear 54 will be of the same size. Gear 52 will be connected to shaft 36 to directly drive elliptical gear 34. The compression ratio can be adjusted during assembly or later by changing the mesh relationship of gears 52 and 54. In this form, the planetary gear system is not required. Therefore, the drive train can be simplified to reduce weight and cost if full adjustability is not required.

Figure 2:
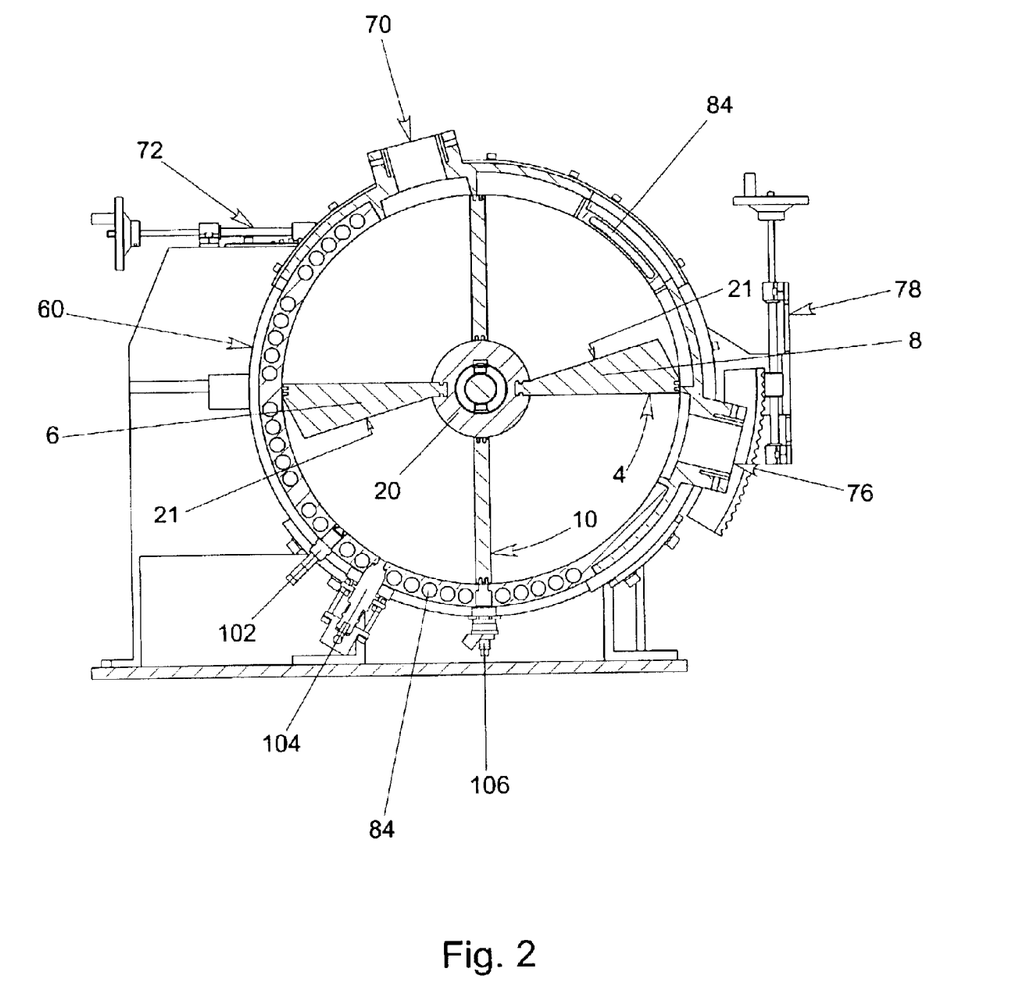
FIG. 2 is a sectional view through the cylindrical combustion chamber.
Figure 3:
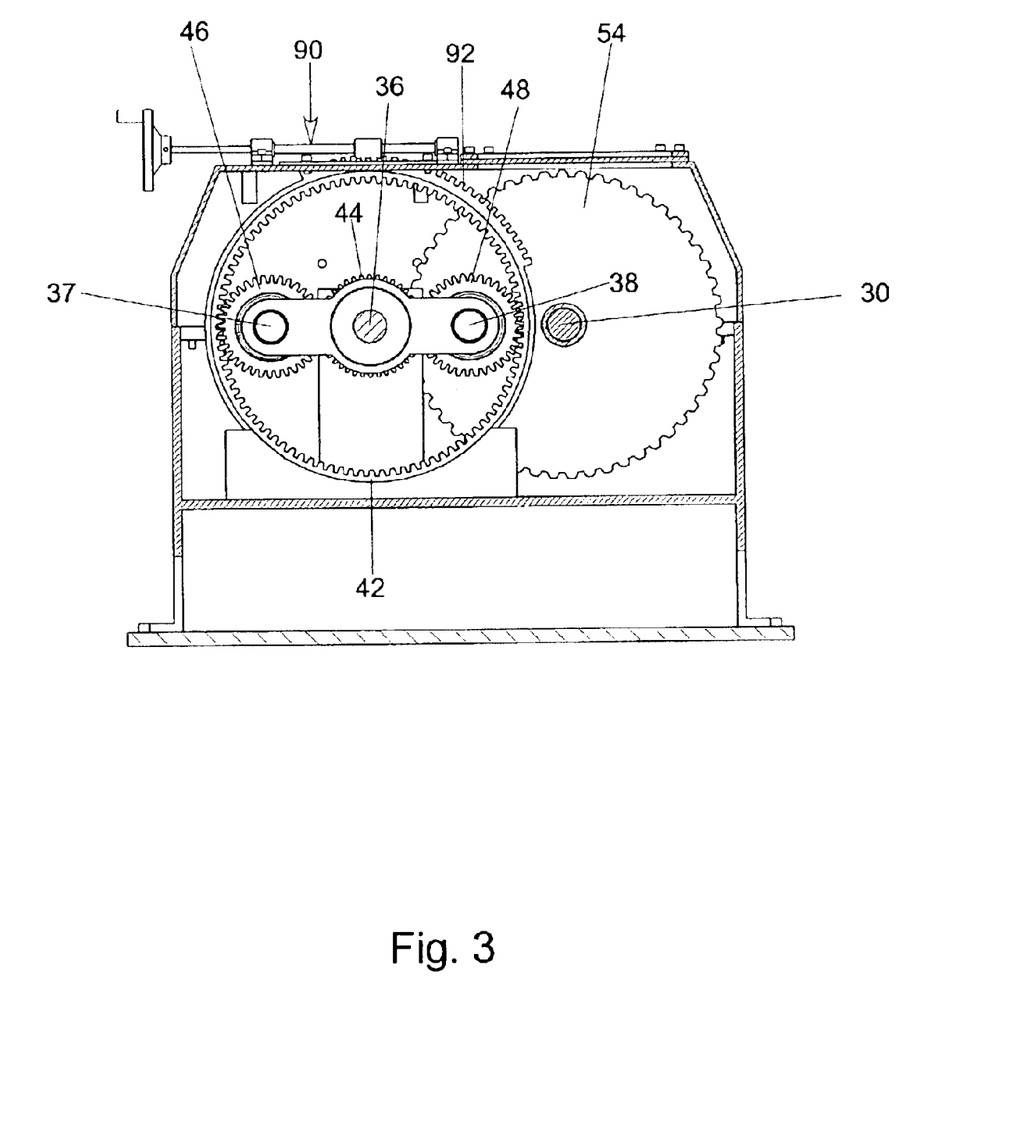
FIG. 3 is a sectional view showing components of the drive train used to interconnect the drive shafts of the rotary members of motor.
Figure 4:
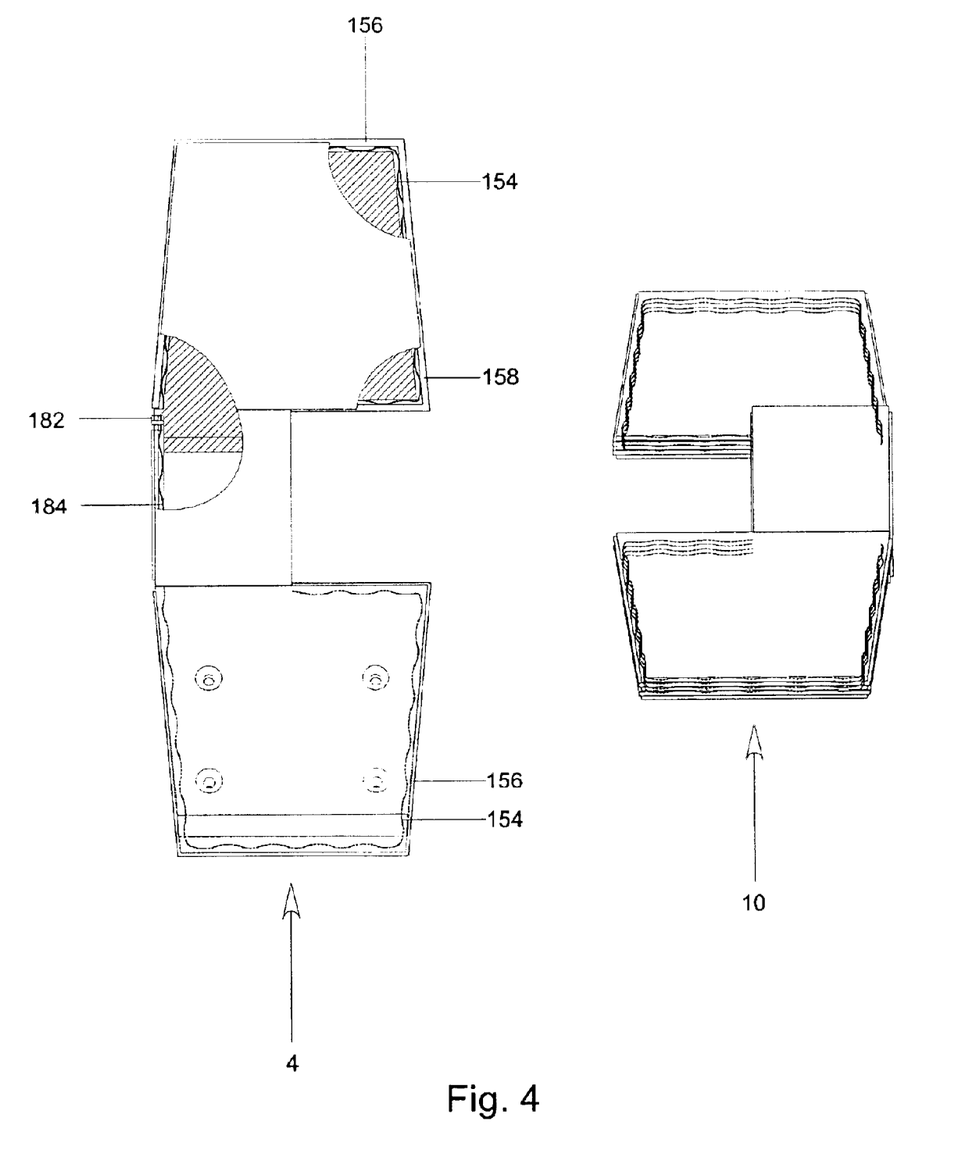
FIG. 4 is a side view of the rotors showing a preferred form of spring loaded seals.
Figure 5:
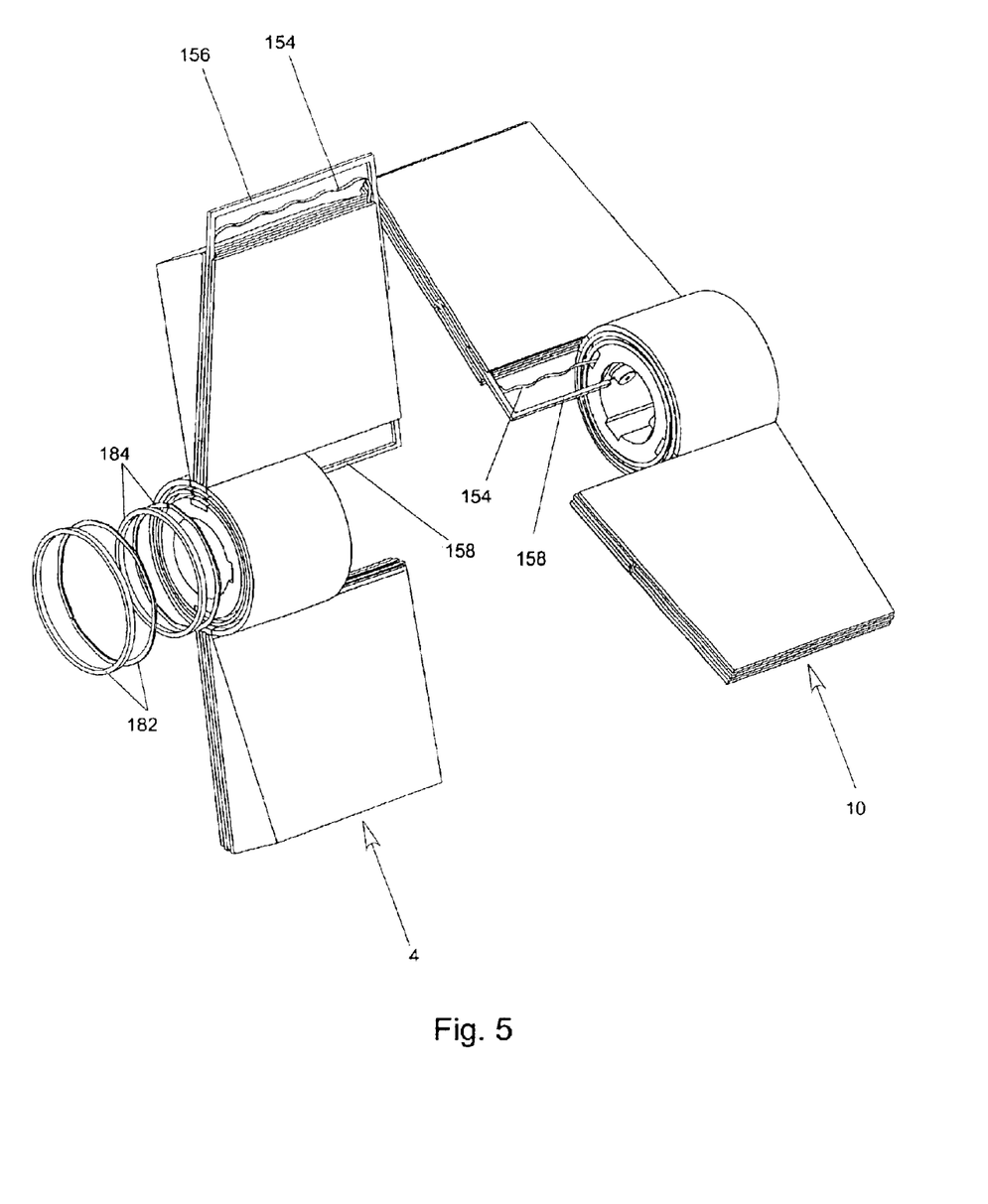
FIG. 5 is a perspective view showing the rotary members and the spring seals.

Additional details of the motor are shown in the sectional view of FIG. 2. The cylindrical chamber 60 includes a spark plug 102 for initiating the combustion process in the case that it is a SI motor, although a CI (diesel) version also operates satisfactorily without the spark plug. Preferably, a lubricant is introduced through the injector 106. A small amount of lubricant is injected into the non working chamber to coat part of the walls of the cylindrical chamber to condition the seals, reduce friction and remove heat. The lubricant injector can be placed at any appropriate point in the cylindrical chamber, however, the indicated position, into the non working chamber during the combustion stage of the working chamber is preferred. The amount of oil injected can be controlled and it may not be necessary to inject oil each cycle. Multiple injection may also prove helpful. With this arrangement, oil coats the cylinder wall but is not introduced into the combustion chambers.

Fuel injector 104 has particular advantages with the rotary variable compression motor. The rotary members 4 and 10 define two opposed working chambers and two opposed non-working chambers and all chambers move past the intake and exhaust ports. With the present design, only air is introduced through the intake port and fuel is introduced into the working chambers by the fuel injector 104. With this arrangement, only air is present in the non-working chambers. This is in contrast to prior art designs where the rotation of the trailing vane away from the intake port produces a low pressure condition which can draw fuel and air into the non working chamber. This is a particular problem where fuel and air are mixed before entering the working chamber. With the fuel injection method described above, better motor performance is realized with respect to fuel efficiency and lower admissions. The fuel injector provides a simple arrangement for distinguishing between working and non-working chambers and also provides an efficient mechanism for fuel delivery. FIG. 2 also illustrates how a combustion face 21 on each of the leading vanes 6 and 8 has a profile of varying thickness to impart a particular shape to the combustion chamber and to reduce the final size of the combustion chamber. This is in contrast to the front face of these leading members which is planar. Other arrangements for varying the shape of the combustion chamber can be used. The first rotary member 4 is of a mass significantly greater than the mass of the second rotary member 10. Preferably, the mass of the first rotary member is at least 50% greater than the mass of the second rotary member, as to reduce the mechanical losses in the secondary rotary member due to acceleration and deceleration.

The intake port 76 and the exhaust port 70 are both slidable along a perimeter edge of the cylindrical chamber. During the intake or exhaust stages of the combustion cycle, the working chamber is either pulling air into the working chamber or exhausting combusted gas out of the working chamber. Therefore the ports are not under high pressure and the ports have a simple mechanism for sliding along a perimeter surface of the cylindrical chamber. The sliding portions of the intake port and the exhaust port are separate from the compression and expansion portions of the cylindrical chamber which have fluid cooling as indicated in the drawings.

FIGS. 4, 5, 7, 8 and 9 provide additional details of the preferred spring loaded sealing arrangement for use with the rotary members. Basically each of the vanes include a perimeter metal seal arrangement 150 which has a pair of seals 152 and associated spring bias members 154 for urging the metal seals into contact with the walls of the cylindrical chamber and the sides of the end plates 80 and 81. In addition, the central spindles include appropriate sealing rings 182, 184, 186, 188, 190 and 192.

Figure 7:
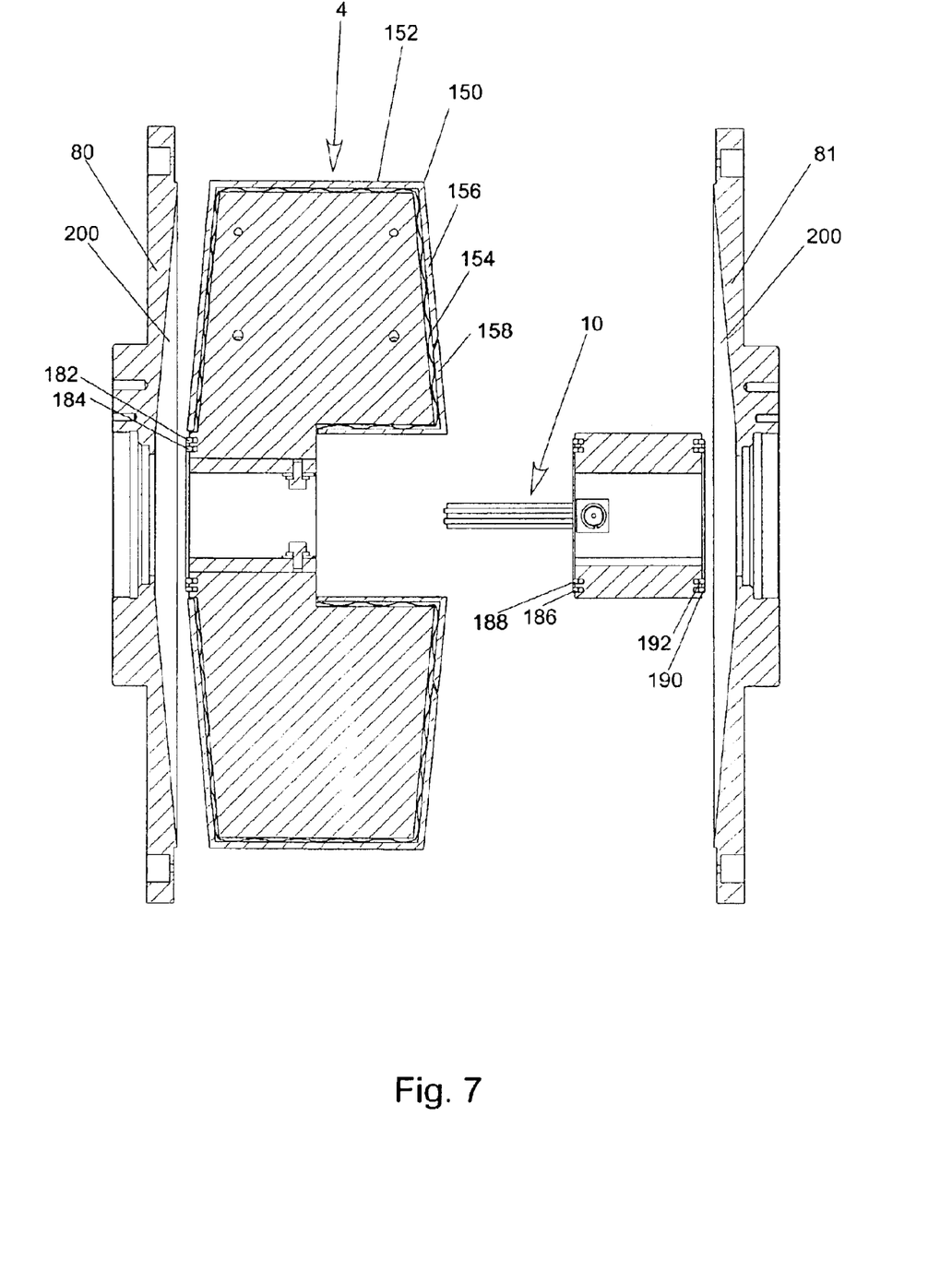
FIG. 7 is a sectional view through the vanes and closing plates of the cylinder.
Figure 8:
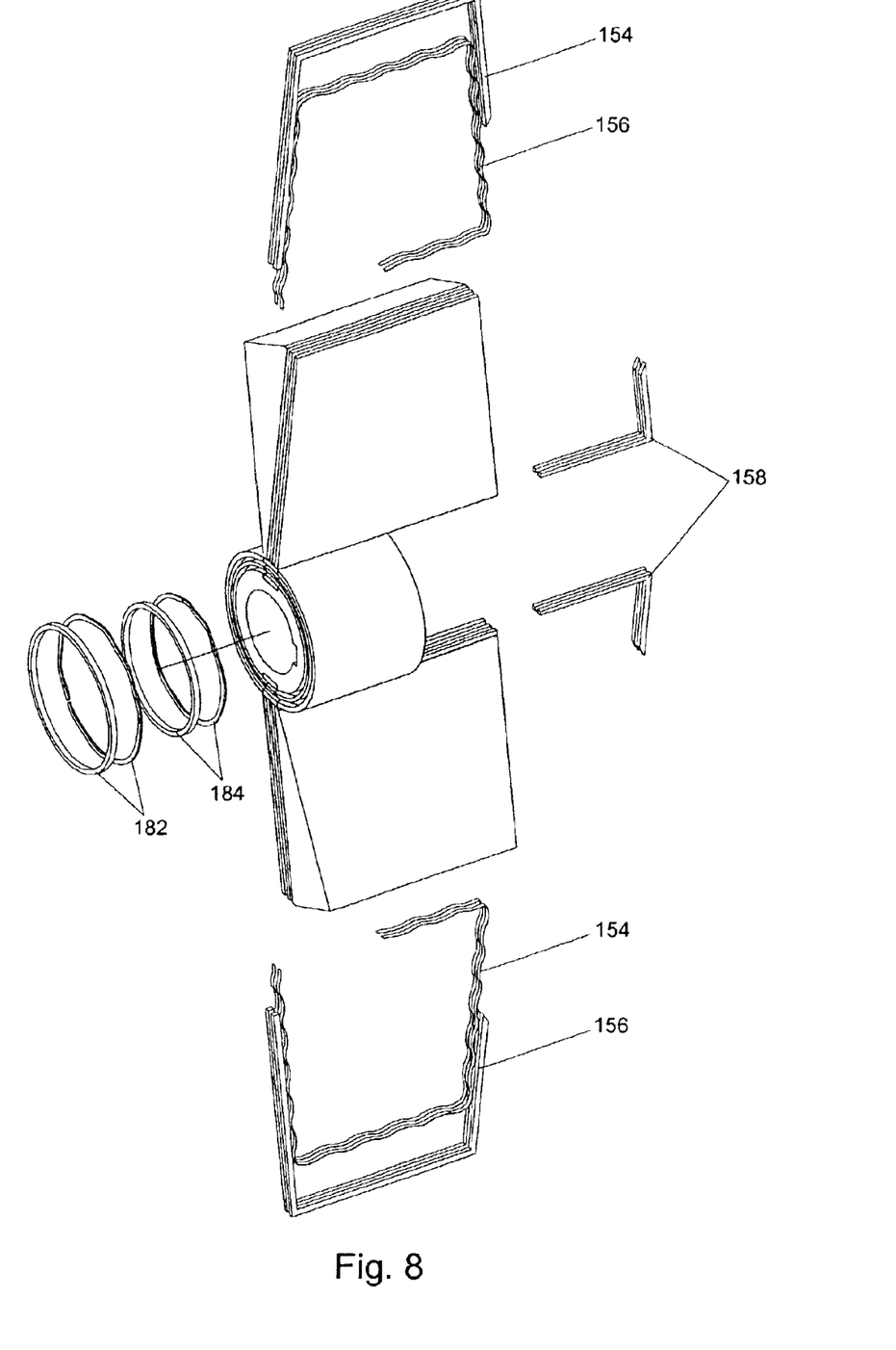
FIG. 8 is a perspective view of the leading vanes with the associated sealing elements.
Figure 9:
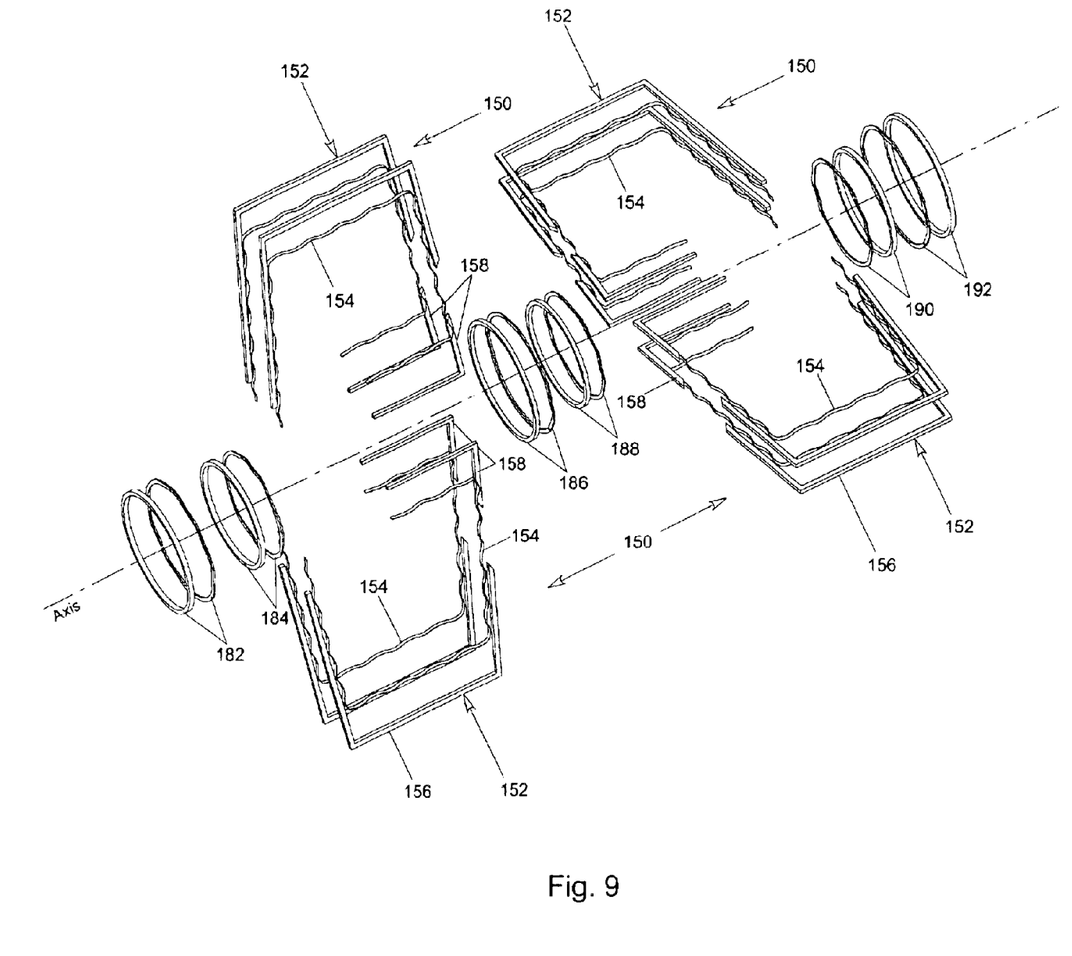
FIG. 9 is a perspective view of the sealing elements of both leading and trailing vanes.

FIGS. 7 through 9 show details of the sealing rings used to seal the perimeter of the leading and trailing vanes relative to the cylinder and the end plates 80 and 81. As shown in FIG. 7, the interior walls 200 of the end plates 80 and 81 are at an angle of approximately five degrees and the rotary vanes have a similar angle to define an outwardly tapering vane. A perimeter seal 150 is provided about a significant portion of each rotary vane and this perimeter seal is formed by a perimeter seal assembly 152 and a spring bias member 154. The perimeter seal assembly 152 is broken into two pieces 156 and 158. With this arrangement, expansion of the seal outwardly can occur and improved sealing with increasing speed occurs, due to centrifugal force. The first rotary member 4 defining the leading vanes, has two pairs of ring seals 182 and 184 for the sealing adjacent rotary axis of the member with end plate 80. A second set of ring seals 186 and 188 are provided between the rotary member 4 and the rotary member 10 and a further set of ring seals 190 and 192 are provided between the rotary member 10 and the end plate 81. With this arrangement, the various ring seals and perimeter seals serve the same function as the piston rings in a normal piston motor. Basically, the working chambers are sealed during compression and expansion and the working chambers are sealed from the non working chambers which form a lubrication function. Both the leading and trailing rotary members have a series of grooves in the perimeter thereof for receiving the various ring seals and sealing members.

FIGS. 10A through 10F show various positions of the leading rotary member 4 and the trailing rotary member 10. The working chambers are shown as A and B and the non working chambers are shown as C and D.

Figure 10A:
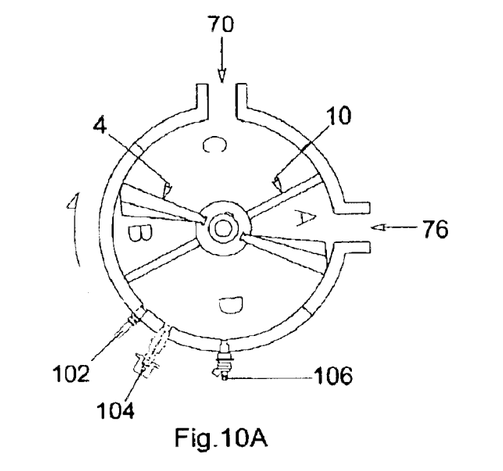
FIGS. 10A through 10F illustrate the vane positions defining different stages of the vane motor
Figure 10B:
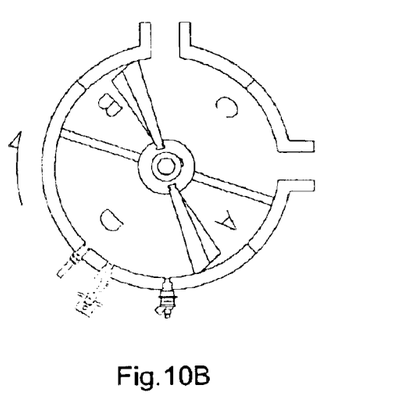
Figure 10C:
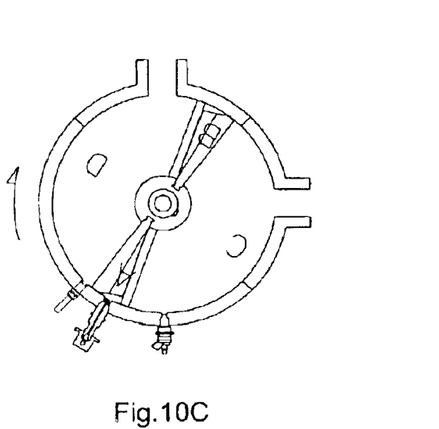

In FIG. 10A, working chamber A is drawing air through the intake port 76. In FIG. 10B the trailing vane has now passed the intake port and working chamber A is about to undergo a compression stage as shown in FIG. 10C. In FIG. 10C, fuel is injected by injector 104 into working chamber A.

Figure 10D:
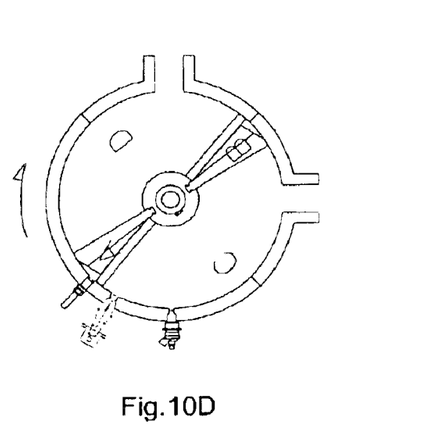

In FIG. 10D, working chamber A has been brought into position such that the spark plug 102 can ignite the fuel and air mixture in working chamber A.

Figure 10E:
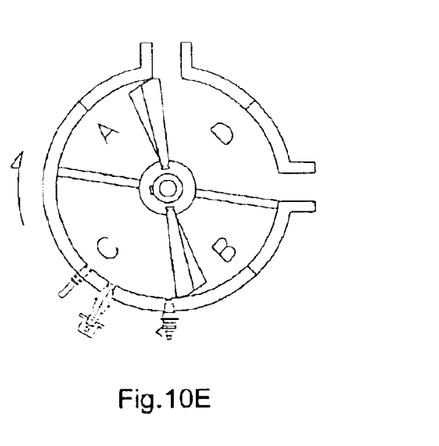

In FIG. 10E, expansion of the working chamber A occurs which is the power stroke of the motor.

Figure 10F:
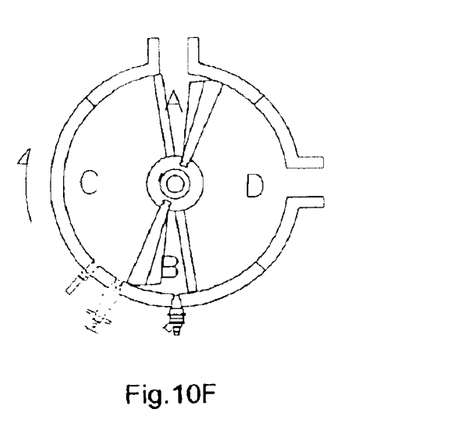

In FIG. 10F, the exhaust stage has occurred as the trailing rotary member has been moved towards the leading rotary member forcing exhaust gas through the exhaust port 70.

FIG. 10C also shows the non working chamber C and the lubricant injector 106. Injector 106 introduces a mist of oil into the non working chamber. This allows a controlled oiling of the cylinder walls, having the sealing to prevent the mist from entering the working chamber A as it moves about the axis of rotation. Thus, lubrication of the motor occurs in the non working chambers alone.

Figure 6:
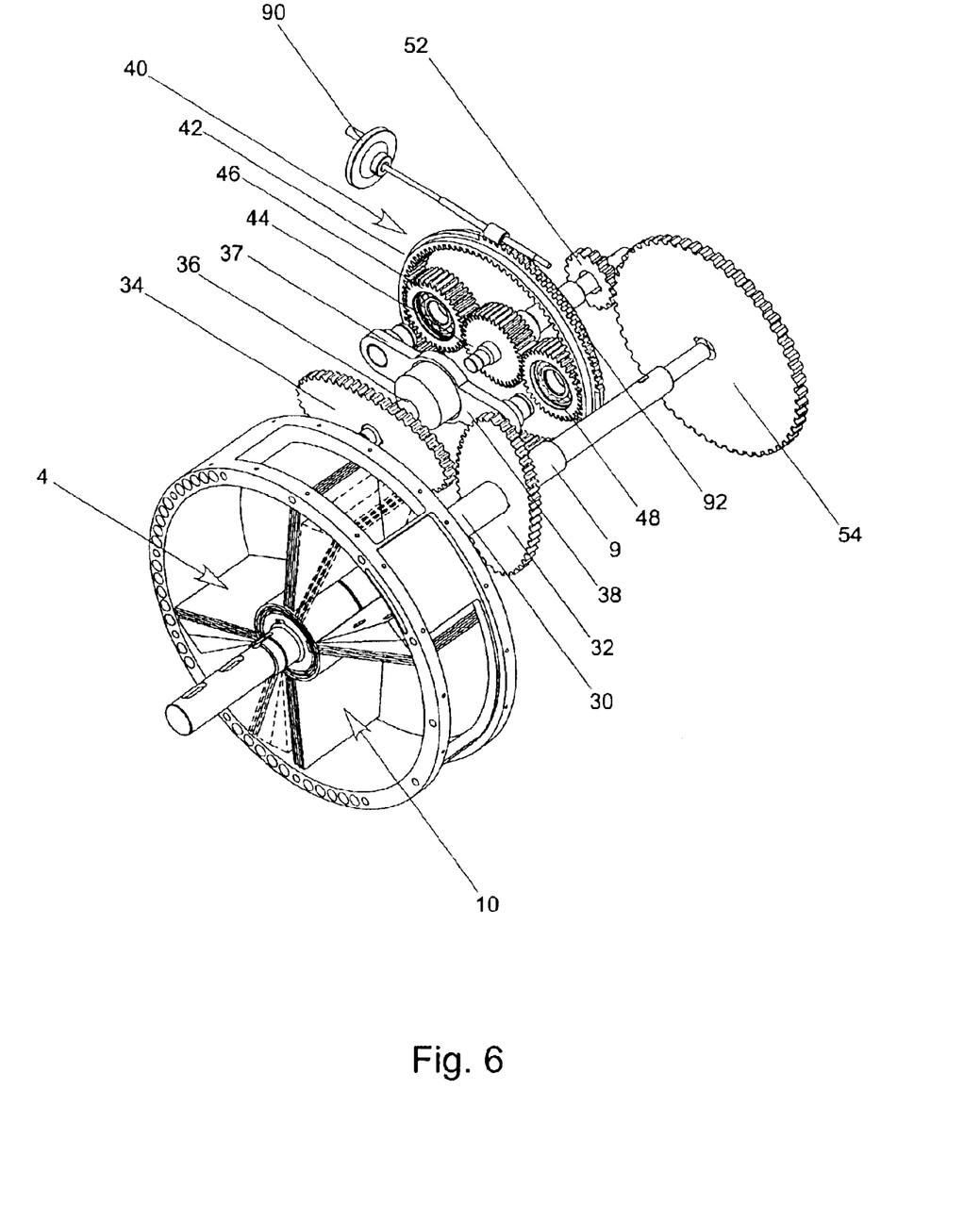
FIG. 6 is a further exploded perspective view showing the various gears of the drive train and the drive relationship with the rotary members.

FIG. 6 shows a further view of the motor similar to FIG. 1 with the various shafts and gears in a working relationship to better understand the gearing used to vary the compression ratio. Closing plates 80 and 81, and the cooling housings 83 and 86 are not shown.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A rotary type motor comprising a first rotary member having a pair of leading vanes and a second rotary member having a pair of trailing vanes with each rotary member having a common central rotation axis, each leading vane having an associated and trailing vane which define therebetween a working chamber such that two opposed working chambers are defined on opposite sides of said common central rotation axis, said vanes rotating within a cylindrical chamber and during each revolution each leading vane and associated trailing vane complete an intake stage, a compression stage, a power stage, and an exhaust stage of a combustion cycle; said cylindrical chamber including an exhaust port and an intake port, said vanes each including a drive shaft with said drive shafts being interconnected by gear train, said gear train including a pair of second order elliptical gears which determine the relative movement of said trailing vanes towards and away from said leading vanes as said vanes rotate about said common central rotation axis and define said stages of said combustion cycle; said gear train further including an adjustment mechanism for varying the position of said trailing vanes relative to said leading vanes at any point in said combustion cycle to thereby vary the compression ratio, and wherein said adjustment mechanism for varying the relative position of said trailing vanes is a planetary gear system with a movable outer ring gear, a central sun gear and a pair of planetary gears, whereby movement of said ring gear varies the position of said trailing vanes relative to said leading vanes and depending upon the direction of rotation of said ring gear the compression ratio is increased or decreased.

2. A rotary type motor as claimed in claim 1 wherein said ring gear is adjustable during the operation of said motor to vary the compression ratio.

3. A rotary type motor as claimed in claim 1 wherein said intake port is movable relative to said cylindrical chamber for adjusting the intake characteristics of said motor and said exhaust port is movable relative to said cylindrical chamber for adjusting the exhaust characteristics of said motor.

4. A rotary type motor comprising a first rotary member having a pair of leading vanes and a second rotary member having a pair of trailing vanes with each rotary member having a common central rotation axis, each leading vane having an associated and trailing vane which define therebetween a working chamber such that two opposed working chambers are defined on opposite sides of said central rotation axis, said vanes rotating within a cylindrical chamber and during each revolution each leading vane and associated trailing vane complete an intake stage, a compression stage defining a compression ratio of said motor, a power stage, and an exhaust stage of a combustion cycle; said cylindrical chamber including an exhaust port and an intake port, said vanes each including a drive shaft with said drive shafts being interconnected by a drive train, said drive train controlling relative movement of said trailing vane towards and away from said leading vane as said vanes rotate about said common central rotation axis to define said stages of said combustion cycle; said drive train further including an adjustment mechanism for varying the position of said trailing vanes relative to said leading vanes to vary the compression ratio of said motor and wherein said adjustment mechanism comprises a planetary gear system with a rotatable outer ring gear, a central sun gear and a pair of planetary gears, whereby rotary movement of said ring gear in a first direction varies the position of said trailing vanes relative to said leading vanes to increase the compression ratio and rotary movement in an opposite direction varies the position of said trailing vanes relative to said leading vanes to decrease the compression ratio.

5. A rotary type motor as claimed in claim 4 wherein said ring gear is adjustable during the operation of said motor to vary the compression ratio.

6. A rotary type motor as claimed in claim 5 including a motor working parameters sensing arrangement and a processor for adjusting the compression ratio as a function of sensed motor parameters.

7. A rotary type motor as claimed in claim 4 wherein said intake port includes an adjustment mechanism for adjusting the angular position of the intake port along said cylindrical chamber.

8. A rotary type motor as claimed in claim 4 wherein said exhaust port includes an adjustment mechanism for adjusting the angular position of the exhaust port along said cylindrical chamber.

9. A rotary type motor as claimed in claim 7 wherein said exhaust port includes an adjustment mechanism for adjusting the angular position of the exhaust port along said cylindrical chamber.

10. A rotary type motor as claimed in claim 4 wherein said cylindrical chamber includes an open exhaust portion which is partially closed by said exhaust port, said exhaust port being movable along said exhaust portion whereby the position of the exhaust port is movable along said cylindrical chamber.

11. A rotary type motor as claimed in claim 4 wherein said cylindrical chamber includes an open intake portion which is partially closed by said intake portion, said intake port being movable along said intake portion whereby the position of the intake port is movable along said cylindrical chamber.

12. A rotary type motor as claimed in claim 4 wherein said leading vane has a non planar surface facing the associated trailing vane which in combination with said trailing vane during a compression stage of said cycle defines a combustion chamber which is shifted outwardly away from said common central rotation axis.

13. A rotary type motor as claimed in claim 4 including an adjustable intake port movable in to different intake operating positions of said cylindrical chamber, each intake operating position having a different timing relationship with said vanes to alter air intake characteristics of said motor.

14. A rotary type motor as claimed in claim 4 wherein said exhaust port is movable to different exhaust operating positions of said cylindrical chamber, each exhaust operating position having a different timing relationship with said vanes to alter the exhaust characteristics of said motor.

15. A rotary type motor as claimed in claim 4 including an adjustable intake port movable in to different intake operating positions of said cylindrical chamber, each intake operating position having a different timing relationship with said vanes to alter air intake characteristics of said motor and wherein said exhaust port is movable to different exhaust operating positions of said cylindrical chamber, each exhaust operating position having a different timing relationship with said vanes to alter the exhaust characteristics of said motor.

16. A rotary type motor as claimed in claim 4 including a direct fuel injector positioned in said cylindrical chamber to insert fuel between said leading and trailing vanes during said compression stage and said motor includes spark ignition.

17. A rotary type motor as claimed in claim 16 including a lubricant injector which injects a lubricant into a nonworking chamber defined between the trailing vane and the leading vane.

18. A rotary type motor as claimed in claim 4 including a fuel injector for injecting fuel into said working chamber for combustion during said compression stage.

19. A rotary type motor as claimed in claim 4 wherein said adjustment mechanism for varying the position of said trailing vanes relative to said leading vanes to vary the compression ratio is movable between a first position operable with a first fuel and a different position operable with a fuel different than said first fuel.

20. A rotary type motor as claimed in claim 4 wherein said compression ratio is varied according to a fuel used to operate said motor.

21. A rotary type motor as claimed in claim 4 wherein said first rotary member is of a mass significantly greater than the mass of said second rotary member.

22. A rotary type motor as claimed in claim 21 wherein the mass of said first rotary member is at least 50% greater than the mass of said second rotary member.

* * * * *